F. D. JOHNSON AND H. CULLENY.
AUXILIARY AUTOMOBILE LICENSE TAG.
APPLICATION FILED MAY 10, 1921.
1,398,489.
Patented Nov. 29, 1921.
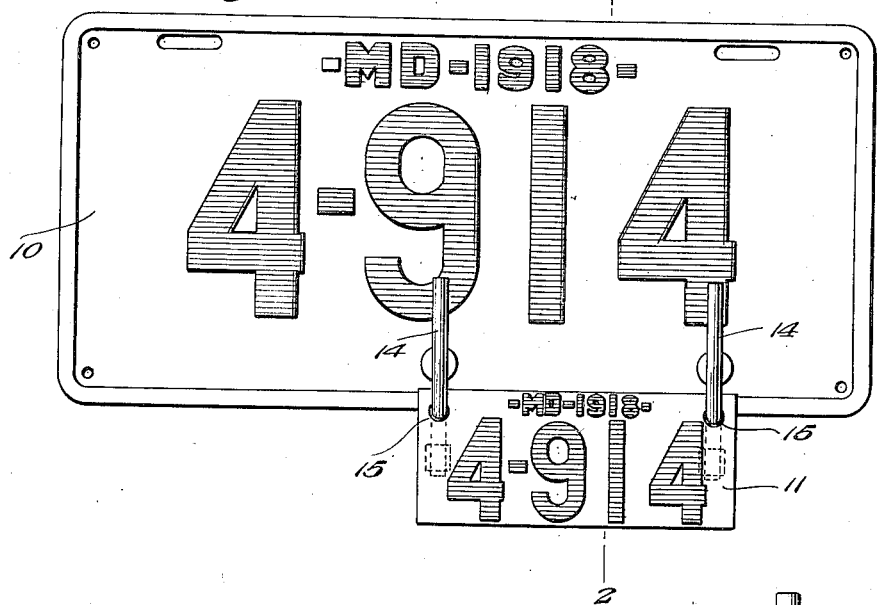
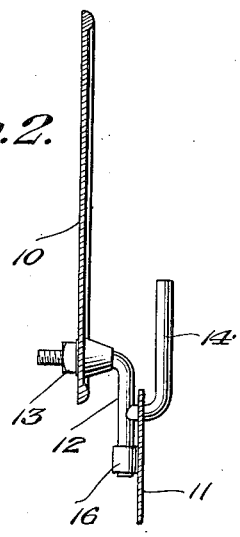
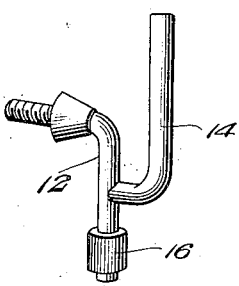
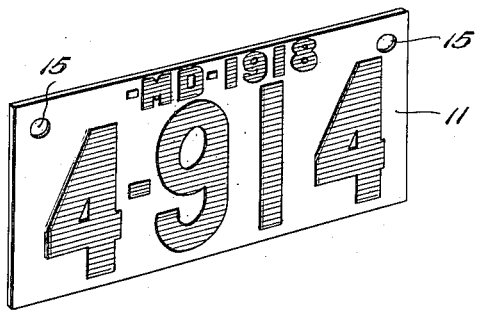
Frederick D. Johnson
Henrietta Culleny
INVENTOR
BY Victor J. Evans
ATTORNEY
WITNESS:

UNITED STATES PATENT OFFICE.

FREDERICK D. JOHNSON AND HENRIETTA CULLENY, OF BALTIMORE, MARYLAND.

AUXILIARY AUTOMOBILE LICENSE-TAG.

1,398,489.  Specification of Letters Patent.  Patented Nov. 29, 1921.

Application filed May 10, 1921. Serial No. 468,405.

*To all whom it may concern:*

Be it known that we, FREDERICK D. JOHNSON and HENRIETTA CULLENY, citizens of the United States, residing at Baltimore, in the State of Maryland, have invented new and useful Improvements in Auxiliary Automobile License-Tags, of which the following is a specification.

This invention comprehends the provision of an auxiliary license tag for motor operated vehicles or the like, the invention having for its object, the provision of an auxiliary tag adapted to be removably associated with the regular license plate when the vehicle is in use, and removed from said plate by the driver or operator of the vehicle when the car is not being used, so that its absence from a machine in operation affords evidence of the fact that the car is being stolen or driven by an unauthorized person.

More specifically stated, the invention contemplates the provision of a pair of hook-like elements adapted to be associated with the regular license plate, and upon which the auxiliary tag is adapted to be supported, the tag bearing the same indicia as that contained by the license plate, means being provided to prevent rattling of the auxiliary tag incident to the vibration of the tag when in use.

The nature and advantages of the invention will be better understood when the following detailed description is read in connection with the accompanying drawing, the invention residing in the combination, construction, and arrangement of parts as claimed.

In the drawing forming part of this application, like numerals of reference indicate similar parts in the several views and wherein:

Figure 1 is a view in elevation of the license plate, showing the auxiliary tag associated therewith.

Fig. 2 is a sectional view taken on line 2—2 of Fig. 1.

Fig. 3 is a detail view of one of the hook-like supporting elements.

Fig. 4 is a similar view of the auxiliary tag.

Referring to the drawing in detail, 10 indicates a license plate of wellknown construction, and with which the auxiliary tag 11 is adapted to be associated. The tag 11 is comparatively small with regard to the plate 10, but contains the same indicia as that carried by the plate 10. The auxiliary tag 11 is adapted to be supported by the plate 10, preferably at the lower edge of the latter and in which position it can be readily seen, as it is only intended to be associated with the plate when the vehicle is in use. The auxiliary tag 11 is supported so that it can be quickly and easily separated from the plate 10 by the driver or operator of the car when he leaves the latter, so that should the machine be operated during his absence, the absence of the auxiliary tag from the machine would indicate that the machine was being driven by an unauthorized person.

The auxiliary tag 11 can be associated with the license plate for the purpose above mentioned in any suitable manner, but as shown in this specific instance, use is made of a pair of substantially L-shaped bolts 12 which are passed through suitable openings provided in the license plate 10 and secured thereto by means of nuts 13, with a branch of each bolt depending below the lower edge of the plate 10. This particular branch of each bolt supports a hook-like element 14 which extends upwardly in parallel relation with the plate 10, and these hook-like elements are adapted to be received by the openings 15 formed in the auxiliary tag 11 adjacent the upper corners thereof, so that the auxiliary tag when in position for use hangs below the lower edge of the plate 10 in spaced parallel relation to the latter. The tag is merely suspended from the hook-like elements, so that it can be quickly and easily detached when desired and for the purpose above mentioned, and associated with the hook-like elements when its use is necessary. In order to prevent rattling of the auxiliary tag by its coming in contact with the L-shaped bolts, incident to the vibration of the tag when the machine is in use, we equip each of said bolts with a sleeve 16 of rubber or other suitable material against which the tag rests. The invention is very simple in construction, and can be manufactured and sold at a very nominal cost, and is designed to be associated with license plates of wellknown construction.

While it is believed that from the foregoing description the nature and advantages of the invention will be readily apparent, we desire to have it understood that we do not limit ourselves to what is herein shown and described, and that such changes may be resorted to when desired as fall within the scope of what is claimed.

What we claim is:

The combination with an automobile license plate, of elements secured to said plate, hook-like elements supported to said elements, a comparatively small auxiliary license tag supported by said hook-like members to project below said plate in parallel relation thereto, and sleeves of relatively soft material carried by said elements and against which the auxiliary tag rests for the purpose specified.

In testimony whereof we affix our signatures.

FREDERICK D. JOHNSON.
HENRIETTA CULLENY.